United States Patent [19]

Havemann

[11] Patent Number: 4,616,743

[45] Date of Patent: Oct. 14, 1986

[54] CENTRIFUGAL CLUTCH PARTICULARLY USEFUL IN TRANSPORT REFRIGERATION UNIT

[75] Inventor: Robert K. Havemann, Bloomington, Minn.

[73] Assignee: Thermo King Corporation, Minneapolis, Minn.

[21] Appl. No.: 690,718

[22] Filed: Jan. 11, 1985

[51] Int. Cl.⁴ .............................................. F16D 43/18
[52] U.S. Cl. ................................................ 192/105 BA
[58] Field of Search .................. 192/76, 89 W, 103 B, 192/105 BA, 105 A, 105 BB; 188/134, 136, 185

[56] References Cited

U.S. PATENT DOCUMENTS

| | | | |
|---|---|---|---|
| 1,196,015 | 8/1916 | Nelson | 464/6 |
| 1,715,807 | 6/1929 | Wersall | 192/105 BA |
| 1,819,830 | 8/1931 | Wersall | 192/105 BA |
| 1,870,649 | 8/1932 | Rawson | 192/105 BA |
| 2,382,228 | 8/1945 | Howell | 188/185 |
| 2,529,610 | 11/1950 | Jensen et al. | 192/105 BA |
| 2,840,209 | 6/1958 | Binder | 192/105 BA |
| 3,255,855 | 6/1966 | Peras | 192/105 BA |
| 3,724,621 | 4/1973 | Heidron | 192/105 BA X |

FOREIGN PATENT DOCUMENTS 458672  2/1975  U.S.S.R. ....................... 192/105 BA

Primary Examiner—George H. Krizmanich
Attorney, Agent, or Firm—E. C. Arenz

[57] ABSTRACT

A clutch is provided in which the friction shoes 40a, b and c are attached to a hub 38 through leaf springs 48a, 48b, 48c with the leading end of the leaf springs, relative to hub rotation, being connected to the leading end portions of the hub surfaces 38a, b and c, and the trailing end portions of the springs being connected to the trailing end portions of the shoes, the originally flat leaf springs assuming a shallow S-shape by being connected to the parts, this S-shape of the springs absorbing torque peaks from the internal combustion engine driving the clutch.

7 Claims, 6 Drawing Figures

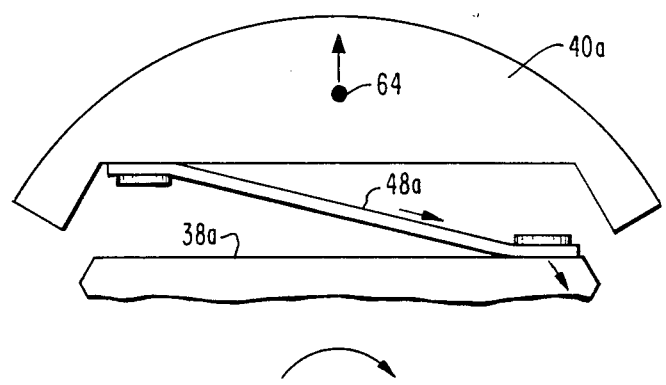

CENTRIFUGAL CLUTCH PARTICULARLY USEFUL IN TRANSPORT REFRIGERATION UNIT

BACKGROUND OF THE INVENTION

This invention pertains to the art of centrifugal clutches, and particularly to the art of clutches useful in transport refrigeration units.

A conventional method for providing either internal combustion engine drive or electric motor drive for a refrigerant compressor, such as is used with a transport refrigeration unit, includes an internal combustion engine such as a diesel driving the compressor through a centrifugal clutch and belt and an electric motor which can also drive the compressor through a belt when the engine is not running and the clutch is disengaged.

One commonly used centrifugal clutch arrangement for smaller transport refrigeration units, such as for refrigerated straight trucks, has a pair of clutch shoes mounted to the driving rotor or hub through pivot posts and resilient bushings with a spring system to retract the shoes when the hub is not rotating. Such a centrifugal clutch is used in a refrigeration unit where the refrigerant compressor can be belt driven either by an internal cumbustion engine through the clutch or, alternatively, by an electric motor -- the clutch being disengaged of course when the engine is stopped. These conventional clutches have failed in sufficient quantities to create a significant warranty problem for the refrigeration unit manufacturer.

It is my view that many of the failures stem from severe torque peaks generated by the internal combustion engine under certain conditions imposing structural damage to the clutch parts, such as breaking the pivot posts at their connection to the hub or bending them, or damaging the resilient bushings in the bores of the shoes. Such torque peaks are more severe with diesel engines than with gasoline engines and are also related to the number of engine cylinders—the fewer the cylinders the greater the problem. As an example in numerical terms of the severity of the torque peaks, the conventional clutch used by the assignee of this application may be rated at, say, 50 foot pounds (82J) torque, while under some conditions it may be subjected to torque peaks up to 500 foot pounds (680J).

The aim of this invention is to provide a different clutch arrangement in which the torque peaks are so absorbed that clutch failures are reduced, as well as to provide a relatively simple clutch construction in which shoe pivot posts are eliminated along with elastomeric bushings associated with the shoes and posts.

SUMMARY OF THE INVENTION

In accordance with the invention a centrifugal clutch having the capability of absorbing torque peaks from a driver such as an internal combustion engine comprises a clutch drum having an internal annular surface, a hub in the drum connected to be rotatably driven by the driver in one direction only, a plurality of friction shoes between the hub and drum, each having a radially outer surface for contacting the internal surface of the drum and a radially inner surface, the periphery of the hub comprising a plurality of successive surface areas corresponding in number to the plurality of the shoes, and the connections between the hubs and shoes comprise a leaf spring connecting each shoe to its respective surface area of the hub, the springs having one end portion connected to the leading end portion, relative to the direction of rotation of the hub, of the respective surface area facing the shoe, and having the opposite end portion connected to a more trailing portion, relative to the direction of rotation of the hub, of said radially inner surface of the shoe.

Other features of construction of the clutch arrangement will be described hereinafter.

DRAWING DESCRIPTION

FIG. 5 is a side edge view of a single spring used in the invention but before its assembly to the other parts of the clutch; and FIG. 6 is a partly schematic view of a part of the hub and a single shoe and the connecting spring as visualized during a torque peak.

DESCRIPTION OF THE PREFERRED EMBODIMENT

Figure 1:
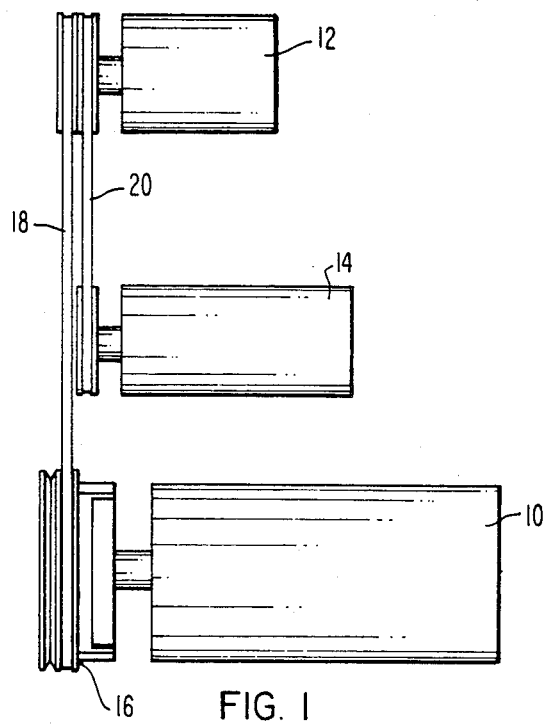
FIG. 1 is a somewhat schematic view of one typical clutch and belt drive arrangement used with a transport refrigeration unit.

In FIG. 1 a typical arrangement in which an engine 10, or alternatively an electric motor 12, may drive a compressor 14 in a transport refrigeration unit. When the engine is operating its output is transmitted through the clutch 16 and belt 18 and belt 20 to drive the compressor. When the engine is not running, the clutch 16 is disengaged and the compressor 14 is driven directly through belt 20 from the motor 12, while the clutch drum free-wheels.

Figure 2:
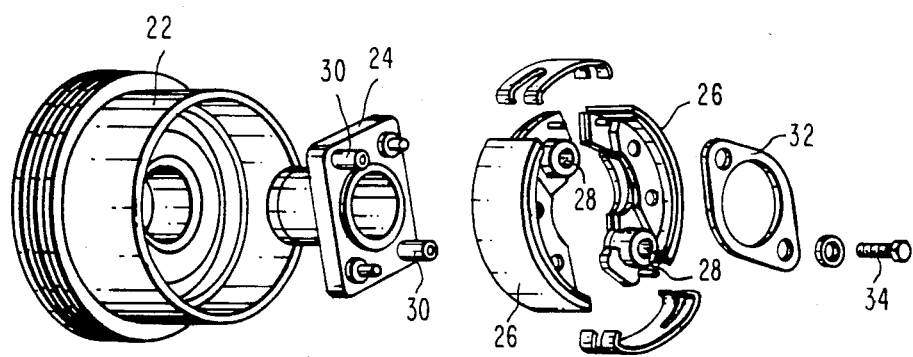
FIG. 2 is an exploded isometric view of a conventional, prior art clutch.

One form of commonly used prior art clutch for transport refrigeration units is shown in FIG. 2 and basically includes the clutch drum 22, rotor or hub 24, a pair of shoes 26 which are mounted to the hub by the resiliently bushed bores 28 being received on the pivot posts 30. A bridge 32 through which a pair of securing bolts 34 pass into the posts 30 is intended to distribute stress on the posts relatively evenly to reduce wear. Typical damage to a clutch construction of this type due to torque peaks includes breaking of the posts 30 from the hub 24, bending of the posts, and failure of the resilient bushings, which frequently become hot through operation of the clutch in a slipping mode.

Figure 3:
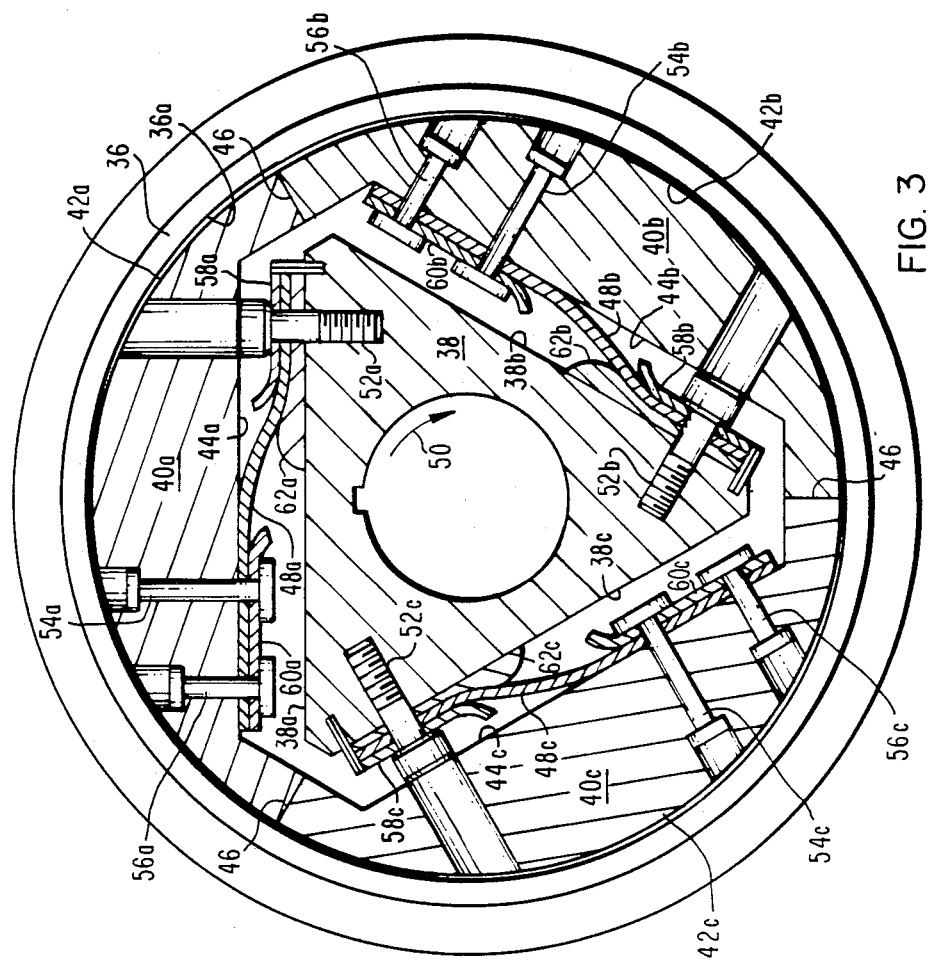
FIG. 3 is a sectional view corresponding to one taken along the lines III—III of a clutch according to the invention.
Figure 4:
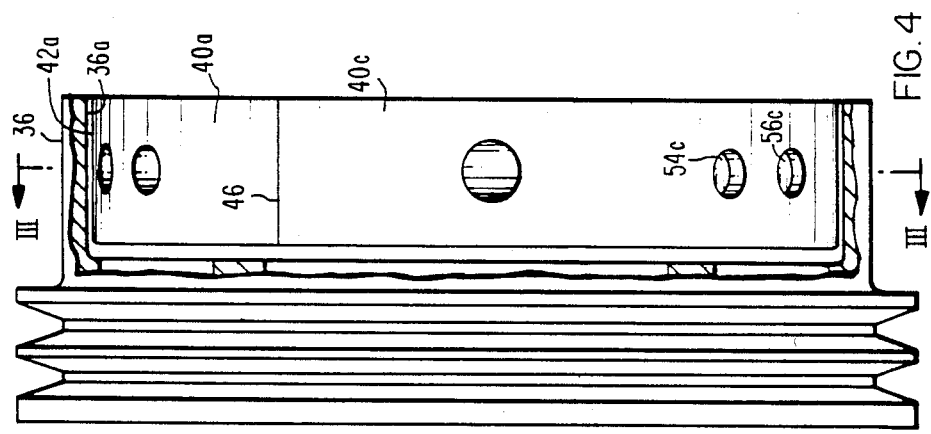
FIG. 4 is a partly broken side view of the clutch of the invention.

The clutch arrangement according to my arrangement is best understood in its essentials in connection with FIGS. 3 and 4. The clutch includes a drum 36 having an internal annular surface 36a, and a rotor or hub 38 in the drum, which in its currently preferred form in outline is generally triangular so that the periphery of the hub presents successive surface areas 38a, b and c. A plurality of friction shoes 40a, b and c are provided between the hub and drum, each shoe having a radially outer surface 42a, b and c for contacting the internal surface 36a of the drum. Each shoe also has a radially inner surface 44a, b and c, each of these surfaces being flat and facing the respective surface areas of the hub and parallel therewith.

The shoes can be made of a heavy cast iron material with a high graphite content. Alternatively they can be made of powdered metal. In one way of making the shoes the three shoes are formed in a single circular blank and the periphery of the blank is machined to precisely the same external diameter as the internal diameter of the drum. The blank is then cut through at the three split locations 46, the material removed from the three split locations thus reducing the external diameter of the three shoes as a whole to provide a clearance of, say, 30 mils between external surfaces of the shoes and the internal surface of the drum.

The shoes are connected to the hub through three spring steel leafs 48a, b and c. These spring steel leafs are flat before being connected between the hubs and shoes, as may be seen in FIG. 5 showing a side edge view of a single spring 48.

Returning to FIGS. 3 and 4, each leaf spring has its leading end portion, relative to the direction of rotation of the hub as indicated by the arrow 50, connected to the leading portion of the respective hub surfaces 38a, b and c, by fasteners 52a, b and c. The opposite or trailing end portion of each leaf spring 48a, b and c, is fastened to the trailing portion of the internal surface 44a, b and c of each shoe by fasteners 54a, b and c and 56a, b and c. In the currently preferred form of construction, clamps 58a, b and c are interposed between the heads of the fasteners 52a, b and c and the leading end portion of the leaf springs. Similarly, clamps 60a, b and c are interposed between the heads of the trailing end fasteners and the trailing end portion of the leaf springs. As seen in FIG. 3, the trailing end portions of the clamps 58a, b and c, and the leading end portions of the clamps 60a, b and c are curved in a direction to conform with the shallow S-shape defined by the leaf springs when they are connected at their ends. These curvatures, along with the curvature in the spring seat ramps 62a, b and c are for the purpose of avoiding stress concentration in the leaf springs during flexing of the springs from torque peaks delivered to the clutch from the engine.

It is vital to the invention that the springs be connected as described relative to the single direction of rotation of the clutch. In that connection reference is made to FIG. 6 which is a somewhat simplified diagram of one of the shoes 40a and a part of the hub 38 and in which the action of the leaf spring 48 during a torque peak is visualized. Each shoe has a center of mass as at 64 and as the hub rotates the centrifugal force through the center of mass brings the shoes outwardly into contact with the drum with a rotational speed above a given value. Of course, when the engine is not operative the springs, in an effort to regain their original flat shape, will retract the shoes from the drum. This retraction is limited by the ends of each adjacent shoe abutting at the splits 46.

In operation without torque peaks the shallow S-shape of the leaf springs will be maintained, it being remembered that the shoes need move outwardly only about 30 mils to contact the drum. Now, when the torque peak is received by the hub, the hub 38 will try to rotate relative to the shoes and as a result the torque peak will tend to try to straighten the length of the leaf springs between their connections as is illustrated in FIG. 6. This can occur without the friction shoes being pulled inwardly from the drum since the centrifugal force outwardly through the center of mass 64 keeps the shoes out against the drum. Thus the torque impulses can be absorbed by the springs with no damage to any parts and with the clutch performing quite satisfactorily with respect to slippage and wear on the drum.

Returning to FIG. 3, the design is such that the length of the spring 48 between the connection points basically determines the preload for retracting the shoes away from the drum. That is, the shorter the unconnected length of spring, the greater the preload, and the higher the engine speed required to move the clutch shoes out to engage the drum. Thus it is easy with such an arrangement to tailor the engagement speed to the right value in accordance with the selection of springs having the proper value of springiness, and by properly locating the fasteners. Also the torque characteristics of the clutch may be tailored to different values according to the requirements of the installation. This is accomplished by adjusting the weight of the shoes and the thickness of the spring material in conjunction with changing the effective length of the spring as was described previously.

While the invention has been described in connection with its currently preferred form in which the hub has a generally triangular outline and three shoes are used, the principles of the invention are applicable to hubs with other geometric peripheries and a different number of shoes.

I claim:

1. A centrifugal clutch having the capability of absorbing driving torque peaks from a driver, said clutch comprising:
   a clutch drum having an internal annular surface;
   a hub in said drum connected to be rotatably driven by said driver in one direction only;
   a plurality of friction shoes between said hub and drum, each shoe having a radially outer surface for contacting said internal surface of said drum, and a radially inner surface;
   the periphery of said hub comprising a plurality of successive surface areas corresponding in number to the plurality of said shoes; and
   a single leaf spring connecting each shoe to each said surface area, each spring being located between one of said surface areas of said hub and the facing part of said radially inner surface of said shoe, each said spring having one portion connected to the leading end portion, relative to said direction of rotation, of the respective surface area facing said shoe, and having the opposite end portion connected to a more trailing portion, relative to said direction of rotation, of said radially inner surface of said shoe, said single leaf spring being the sole connection between each shoe and said hub.

2. A clutch according to claim 1 wherein:
   each said leaf spring, in its length between the locations of connections to said shoe and hub has a shallow S-shape.

3. A clutch according to claim 2 wherein:
   said leaf spring is basically flat before connection to said shoe and hub at said locations, and said shoe and hub locations present surfaces to which the end portions of said spring are clamped which are substantially parallel to each other, but at different radii to effect said S-shape upon said clamping.

4. A clutch according to claim 3 including:
   ramp seat means at each connection location to avoid stress concentration in said spring during flexing of the spring from said torque peaks.

5. A clutch according to claim 1 wherein:
   said plurality of shoes is three; and
   said hub is generally triangular shaped in outline and has a total of three of said surface areas.

6. A centrifugal clutch having the capability of absorbing driving torque peaks from a driver, said clutch comprising:
- a clutch drum having an internal annular surface;
- a hub in said drum connected to be rotatably driven by said driver in one direction only;
- a plurality of friction shoes between said hub and drum, each having a radially outer surface for contacting said internal surface of said drum, a radially inner surface, and a center of mass;
- the periphery of said hub comprising a plurality of successive surface areas corresponding in number to the plurality of said shoes;
- a single leaf spring connecting each shoe to each surface area, each spring being located between one of said surface areas of said hub and the facing part of said radially inner surface of said shoe, each said spring having one end portion connected to the respective surface area facing said shoe at a location leading the center of mass of the respective shoe in rotation of the hub, and having the opposite end portion connected to the inner surface of said shoe at a location trailing the center of mass of said shoe in rotation of the hub, said single leaf spring being the sole connection between each shoe and said hub.

7. A clutch according to claim 6 wherein:
- said plurality of shoes is three;
- said hub is generally triangular shaped in outline and has a total of three surface areas; and
- said shoes each has the general shape and outline of a segment of a circle, and each shoe includes an end portion at each end in abutting relationship with the facing end portion of the next shoe in a disengaged position of said clutch.

* * * * *